United States Patent [19]
Nakajima

[11] Patent Number: 5,392,133
[45] Date of Patent: Feb. 21, 1995

[54] APPARATUS AND METHOD FOR TRANSMITTING IMAGE DATA IN A FORMAT ADAPTED TO A CONDITION OF A DESTINATION

[75] Inventor: Toshifumi Nakajima, Tokyo, Japan

[73] Assignee: Canon Kabushiki Kaisha, Tokyo, Japan

[21] Appl. No.: 83,968

[22] Filed: Jun. 29, 1993

[30] Foreign Application Priority Data

Jun. 30, 1992 [JP] Japan ................. 4-173259

[51] Int. Cl.⁶ ............................................. H04N 1/32
[52] U.S. Cl. ..................... 358/407; 358/434; 358/435; 358/440; 358/468; 358/500
[58] Field of Search ............... 358/402, 407, 403, 434, 358/435, 436, 438, 439, 440, 468, 500, 530; 379/100

[56] References Cited

FOREIGN PATENT DOCUMENTS

| 115974 | 7/1983 | Japan | H04N 1/32 |
| 186464 | 10/1984 | Japan | H04N 1/32 |
| 96441 | 4/1990 | Japan | H04N 1/32 |
| 290377 | 10/1992 | Japan | H04N 1/32 |

*Primary Examiner*—Scott A. Roger
*Attorney, Agent, or Firm*—Fitzpatrick, Cella, Harper & Scinto

[57] ABSTRACT

An image communication apparatus comprises a memory for storing image data to be transmitted to a multiple of addressees, rearranging unit for rearranging the multiple of addressees in accordance with functions thereof, and transmission unit for sequentially transmitting the image data stored in the memory to the multiple of addressees rearranged by the rearranging unit.

27 Claims, 16 Drawing Sheets

FIG. 3

| MSB | | | | | | | LSB |
|---|---|---|---|---|---|---|---|
| DL : initial layer to be transmitted ||||||||
| D : number of differential layers ||||||||
| P : number of bit-planes ||||||||
| Xd : horizontal image size at layer d ||||||||
| Xd　" ||||||||
| Xd　" ||||||||
| Xd　" ||||||||
| Yd : vertical image size at layer d ||||||||
| Yd　" ||||||||
| Yd　" ||||||||
| Yd　" ||||||||
| Lo : lines per stripe at lowest resolution ||||||||
| Mx : max horizontal offset allowed for AT pixel ||||||||
| My : max vertical offset allowed for AT pixel ||||||||
| ----- | ----- | ----- | ----- | HITOLO | SEQ | ILEAVE | |
| ----- | | | | | | | |

```
-----    : Reserved
HITOLO   : high to low
SEQ      : sequential
ILEAVE   : interleave multiple bit-planes
```

| FIG. 6A |
| FIG. 6B |

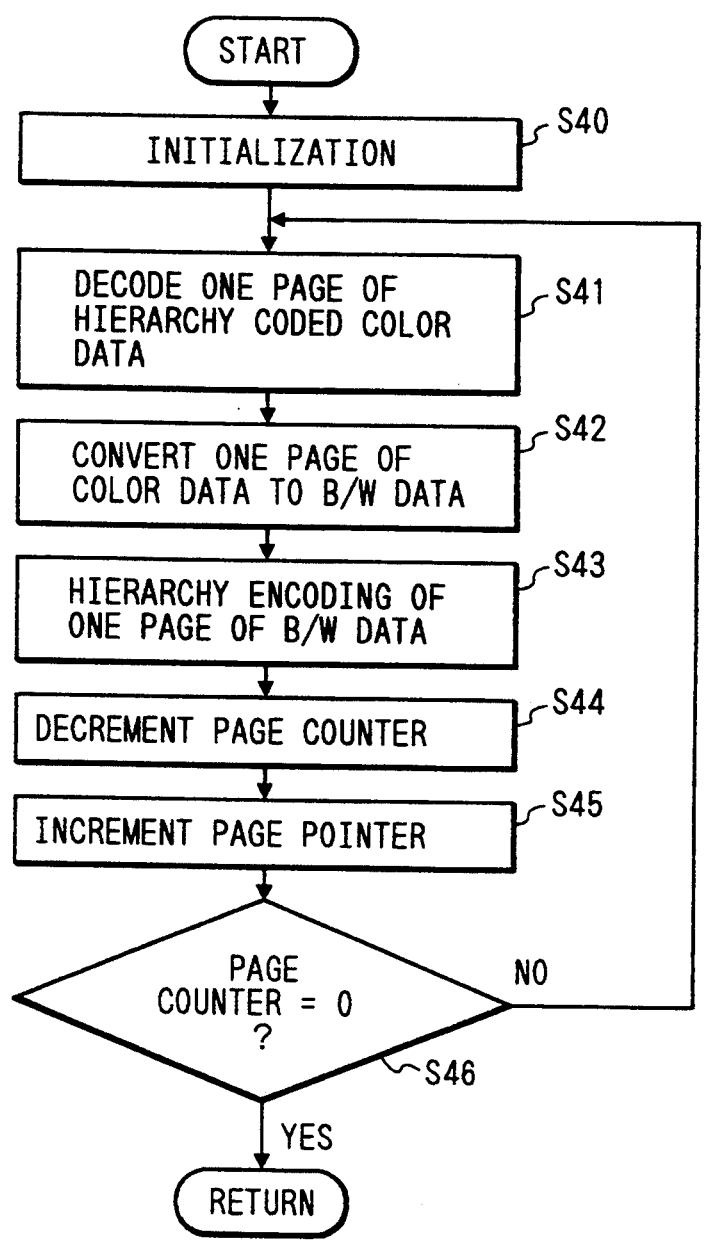

| FIG. 14A |
| FIG. 14B |

FIG. 15
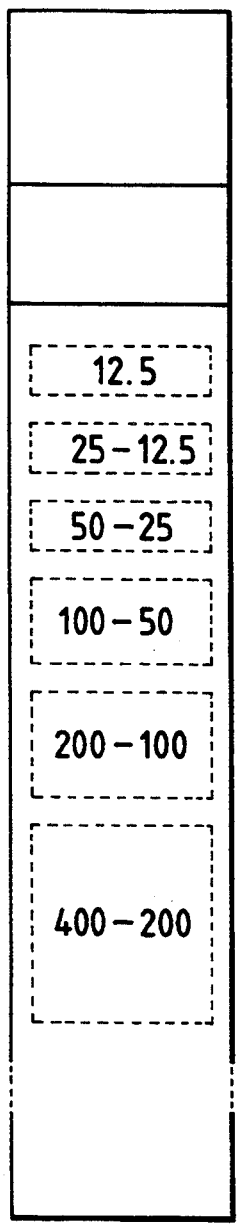
WHEN STORED IN MEMORY
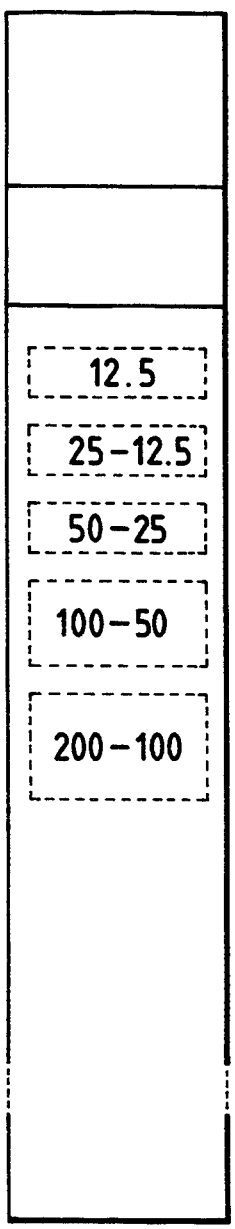
AT STEP S140 SHOWN IN FIG. 14
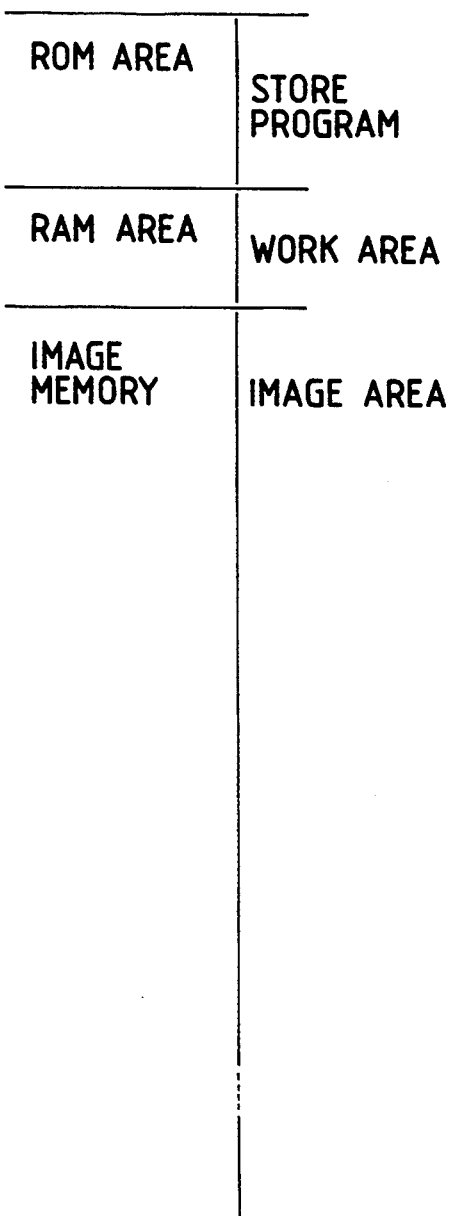

APPARATUS AND METHOD FOR TRANSMITTING IMAGE DATA IN A FORMAT ADAPTED TO A CONDITION OF A DESTINATION

BACKGROUND OF THE INVENTION

1. Field of the Invention

The present invention relates to an image communication apparatus for transmitting image data, and more particularly to an image communication apparatus for transmitting image data in a transmission format adapted to a condition of a destination station of the image data.

2. Related Background Art

As a function of a facsimile device, multi-address transmission which designates a plurality of destinations and transmits the same image to those destinations has been known.

In the prior art, in such multi-address transmission, the order of the transmission is designated by a user.

However, when the multi-address transmission is carried out in the order designated by the user in the color image multi-address transmission, the following problems are encountered.

For example, when a color document is to be transmitted to a color FAX, a monochromatic FAX, a color FAX and a monochromatic FAX, it is transmitted in the order of color, monochromatic, color and monochromatic. Thus, even after the transmission has proceeded to a state that the remaining destination is only the monochromatic station, a large capacity of color image (compared with a monochromatic image) is still stored in an image buffer of a transmission station and hence there is waste of use of the memory.

Further, when the transmission is carried out in the order of color, monochromatic, color and monochromatic, the control is complex. Similar problems, that is, the low efficiency of use of the memory and the complexity of the control are encountered in a facsimile device which adopts a coding system called a hierarchy coding.

SUMMARY OF THE INVENTION

It is an object of the present invention to provide an image communication apparatus which solves the above problems and permits efficient multi-address transmission even if a plurality of destinations having different functions are designated as the addressees of the multi-address transmission.

It is another object of the present invention to provide an image communication apparatus which carries out the multi-address transmission in an efficient manner even if stations capable of receiving color image and stations not capable of receiving the color image are mixedly designated.

It is still another object of the present invention to provide an image communication apparatus which carries out the multi-address transmission in an efficient manner when stations having different receiving resolutions are mixedly designated as the addressees of the multi-address transmission.

It is still another object of the present invention to provide an image communication apparatus which efficiently carries out the multi-address transmission of image data coded by a hierarchy coding.

The above objects and advantages as well as other objects and advantages of the present invention will be apparent from the following description of the invention.

BRIEF DESCRIPTION OF THE DRAWINGS

FIG. 3 shows a header of the hierarchy coding, FIG. 8 shows a flow chart of a color/monochrome conversion process of the embodiment, FIG. 15 shows a 400 dpi/200 dpi conversion memory map in the embodiment.

DETAILED DESCRIPTION OF THE PREFERRED EMBODIMENTS

A preferred embodiment of the present invention is now explained with reference to the accompanying drawings.

Figure 1:
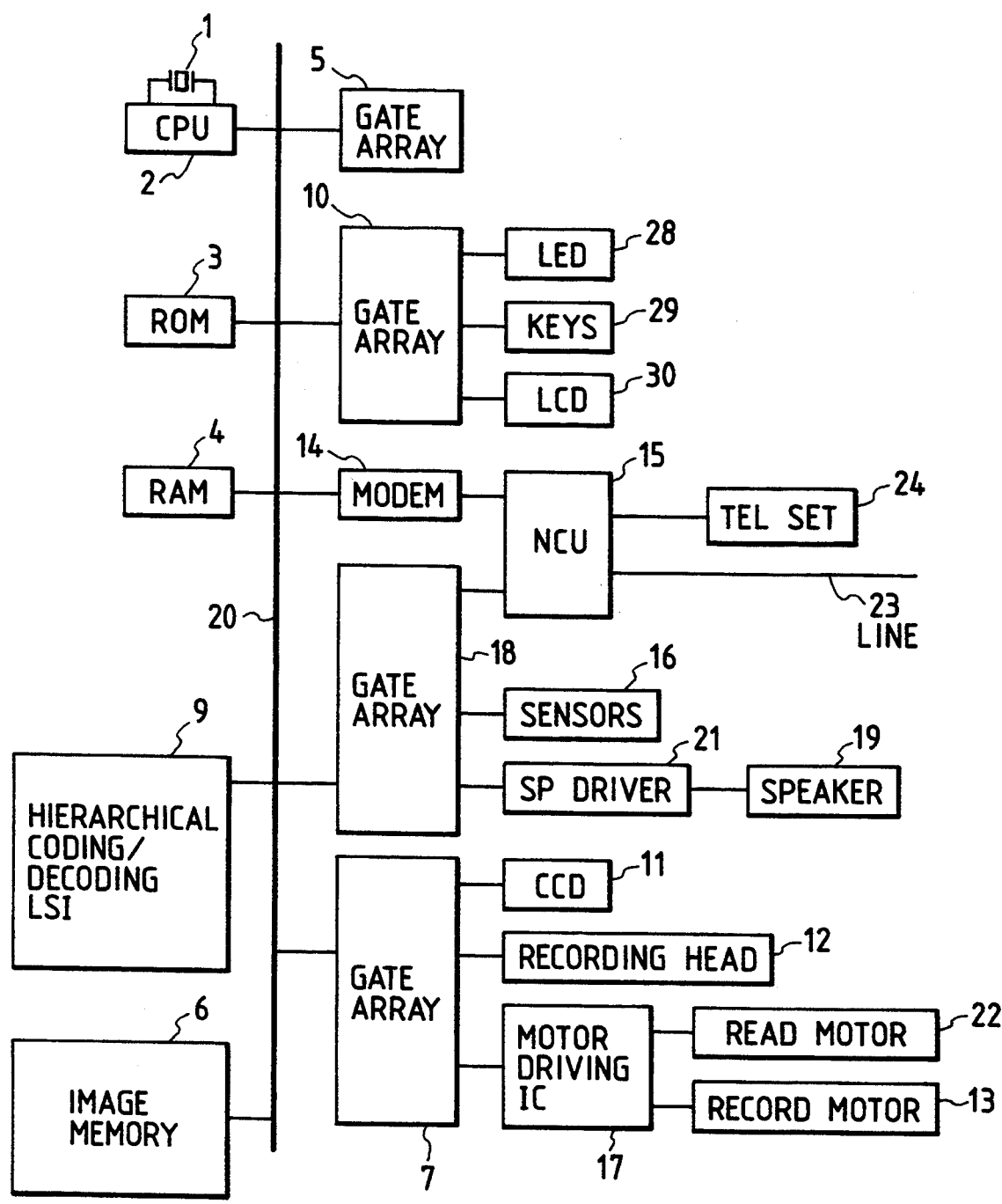
FIG. 1 shows a block diagram of an image communication apparatus in one embodiment of the present invention.

FIG. 1 shows a block diagram of a configuration of a facsimile device which is an image communication apparatus of the present embodiment. In FIG. 1, a CPU 2 is connected to a ROM 3, a RAM 4 and a bus 20 and it controls an overall operation of the apparatus in accordance with a control program stored in the ROM 3. The CPU 2 has a crystal oscillator 1 for generating an operation clock.

In the present apparatus, a reader for reading a document image mainly comprises a CCD line sensor 11 and a read motor 22. An image encoder comprises such elements as a recording head (thermal head) 12 and a record motor 13 and it is used for recording a received image or a reproduced image. The read motor 22 and the record motor 13 are driven by a motor drive IC 17. The operations of the reader and the image recorder are controlled by the CPU 2 through a gate array 7. In the present embodiment, the reader reads a full color image by color decomposition. Accordingly, the CCD line sensor 11 is a color sensor which reads the color image by the color decomposition of red (R), green (G) and blue (B) to output R data, G data and B data.

The R data, G data and B data outputted from the reader are stored in an image memory 6 through a bus 20.

A modem 14 modulates and demodulates the image data and the control protocol data and it is connected to a line 23 through an NCU 15 which holds a loop current of the line 23 and switches the line to a telephone set 24.

S1 or sensors 16 detect status of various moving mechanisms in the apparatus such as the detection of a document sheet position. Speaker 19 serves to inform various messages to an operator and it is driven by a speaker driver 21. The NCU 15, the sensor 16 and the speaker driver 19 are connected to the CPU 2 through a gate array 18.

An LED 28, a key 29 and an LCD 30 are arranged in a console unit and used to enter and display telephone numbers of the destinations. The LED 28, the key 29 and the LCD 30 are connected to the CPU 2 through a gate array 10.

A gate array 5 supplies a system control signal such as activation/deactivation of the circuit blocks of FIG. 1 to the blocks.

A hierarchy coder/decoder 9 codes an image data and decodes the coded data in accordance with the hierarchy coding procedure which is in the process of standardization by the JBIG (Joint Bilevel Image expert Group).

Figure 2:
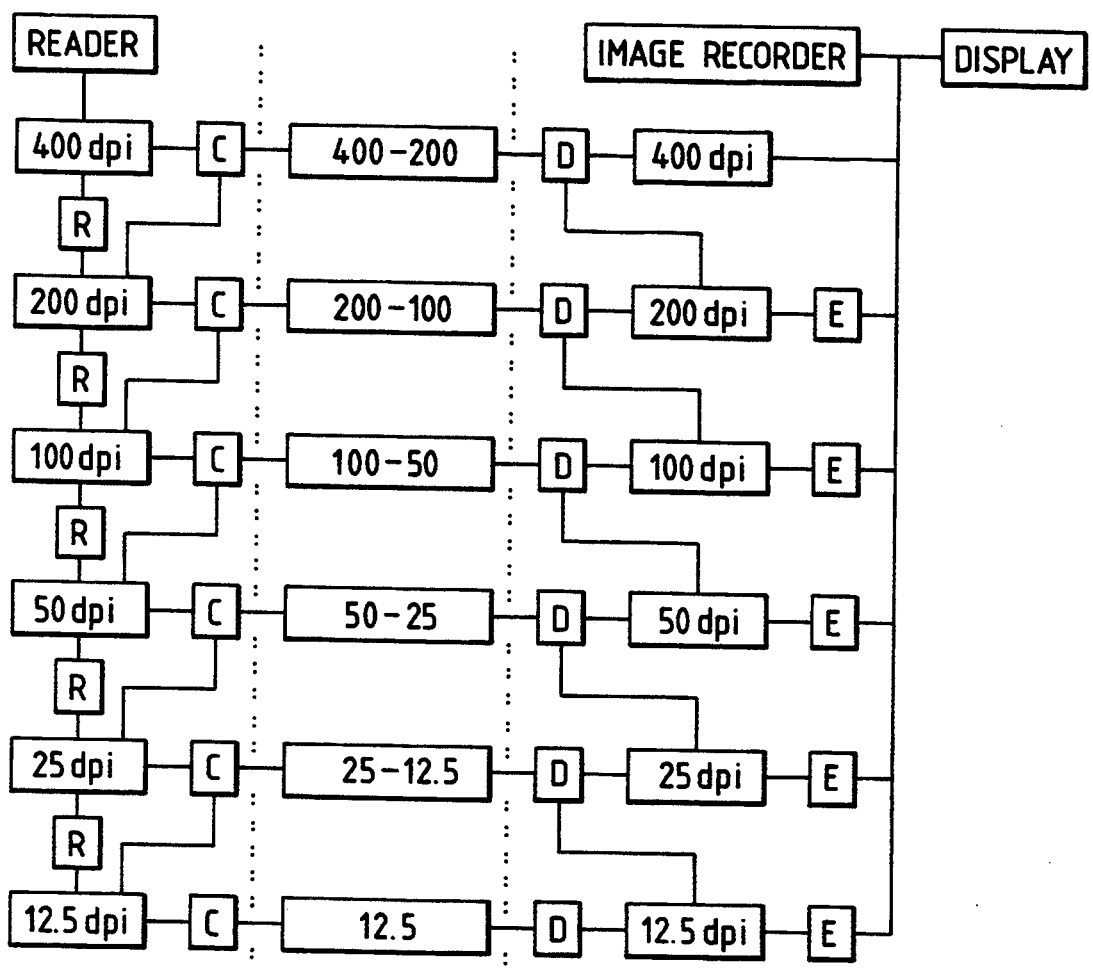
FIG. 2 shows a conceptual view of a hierarchy coding.

FIG. 2 shows a conceptual chart of the hierarchy coding process which is being standardized by the JBIG. In FIG. 2, R denotes a resolution reduction (compression) circuit, E denotes a resolution enhancement (expansion) circuit, C denotes a coding circuit, and D denotes a decoding circuit. In a transmitting station, a resolution of an original image outputted form the reader is 400 dpi. The resolutions of the original image in a horizontal direction and a vertical direction are sequentially reduced by a factor of ½ by the resolution reduction circuit 12 to sequentially form low resolution images having the resolutions of 200 dpi, 100 dpi, 50 dpi, 25 dpi, and 12.5 dpi. The images of different resolutions formed in this manner as well as the original image are sequentially coded in the ascending order of the resolution by the coding circuit C by using an arithmetic coding, for example, and they are sequentially transmitted to receiving stations.

In the receiving station, the coded data which is sequentially transmitted in the ascending order of resolution is sequentially decoded by the decoding circuit D in a reverse procedure to that of the transmitting station, and expanded to desired sizes by the expansion circuit E, and they are displayed on a display unit. Accordingly, the images are sequentially displayed on the display unit in the ascending order of resolution.

In the receiving station, the image of the desired resolution displayed on the display unit is outputted on a recording member such as a sheet by the image recorder as a hard copy. In the transmitting station, the coding and the transmission may be terminated at the image of an intermediate resolution, and in the receiving station, the decoding and the reproduction (display and recording) may be terminated at the image of an intermediate resolution.

As described above, the R data, G data and B data which are stored in the image memory 6 and represent the color image are read color by color, the hierarchy coding shown in FIG. 2 is conducted by the coder/decoder 9, and the coded data of the respective colors are re-stored in the image memory 6 for each hierarchy. The hierarchy coded data of the respective colors stored in the image memory 6 have headers representing the hierarchy number, the resolution and the image size attached thereto.

Referring to FIG. 3, a header to be added to the hierarchy coded data is explained.

In FIG. 3, DL denotes a first layer to be transmitted by the hierarchy coding, D denotes the number of layers other than a closest resolution to be transmitted as a hierarchy code, P denotes the number of bit planes, Xd denotes the number of pixels in a horizontal direction represented by 4 bytes, Yd denotes the number of pixels in a vertical direction represented by 4 bytes, Lo denotes the number of lines of a stripe in the start layer or first layer to be transmitted, Mx denotes a maximum horizontal distance of a template used in the coding, My denotes a minimum vertical distance of the template used in the decoding, HIToLo denotes a bit indicating whether the hierarchy transmission is to be started from the high resolution data or the low resolution data, SEQ denotes a bit indicating whether the sequential transmission is to be conducted or not, and ILEAVE denotes a bit indicating whether data of a plurality of bit planes are to be interleaved or not.

Since the identification headers are added to the hierarchy coded data of the respective colors and they are stored in the image memory 6, the coded data of any hierarchy of any color can be read from the image memory 6.

Figure 4:
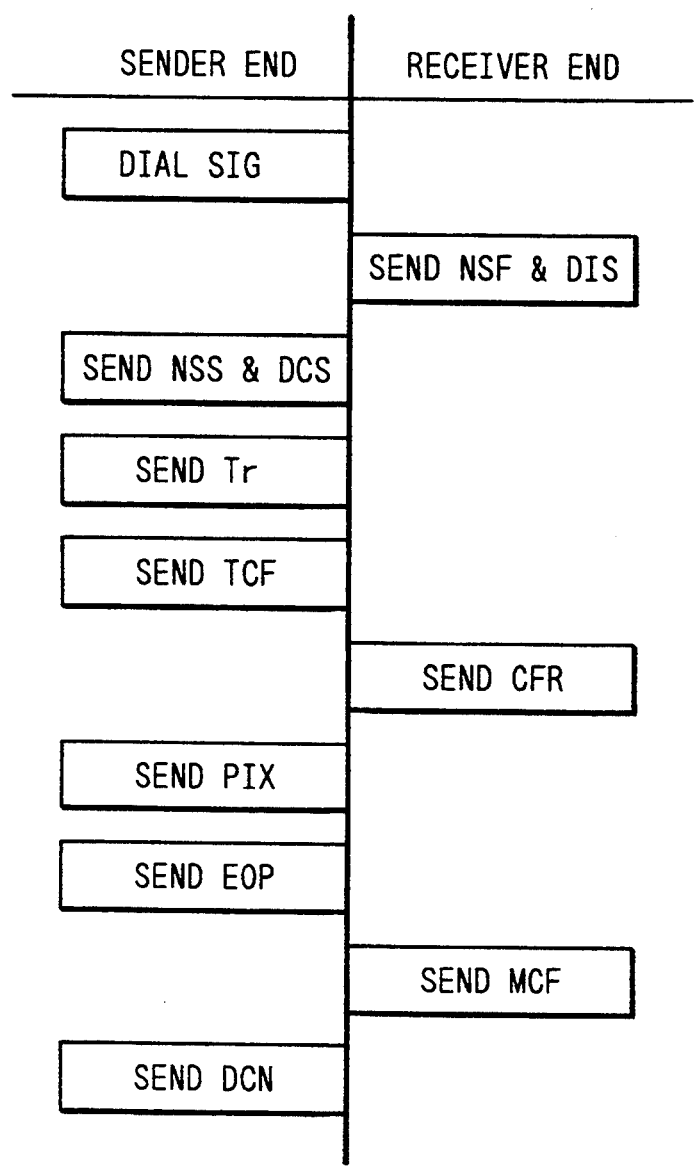
FIG. 4 shows a communication protocol in the embodiment.

FIG. 4 shows an overall communication protocol of the facsimile device of the present embodiment. The communication protocol is in line with the CCITT G3 facsimile protocol and detailed description thereof is omitted. An NSF signal and a DIS signal sent from the receiving station function to transfer the faculty of the apparatus of the receiving station to the transmitting station. In the present embodiment, the NSF signal is used to convey to the transmitting station whether the receiving station has a receiving and reproducing function of color image data, and the DIS signal is used to convey to the transmitting station a resolution at which the receiving station can record or display.

Figure 5:
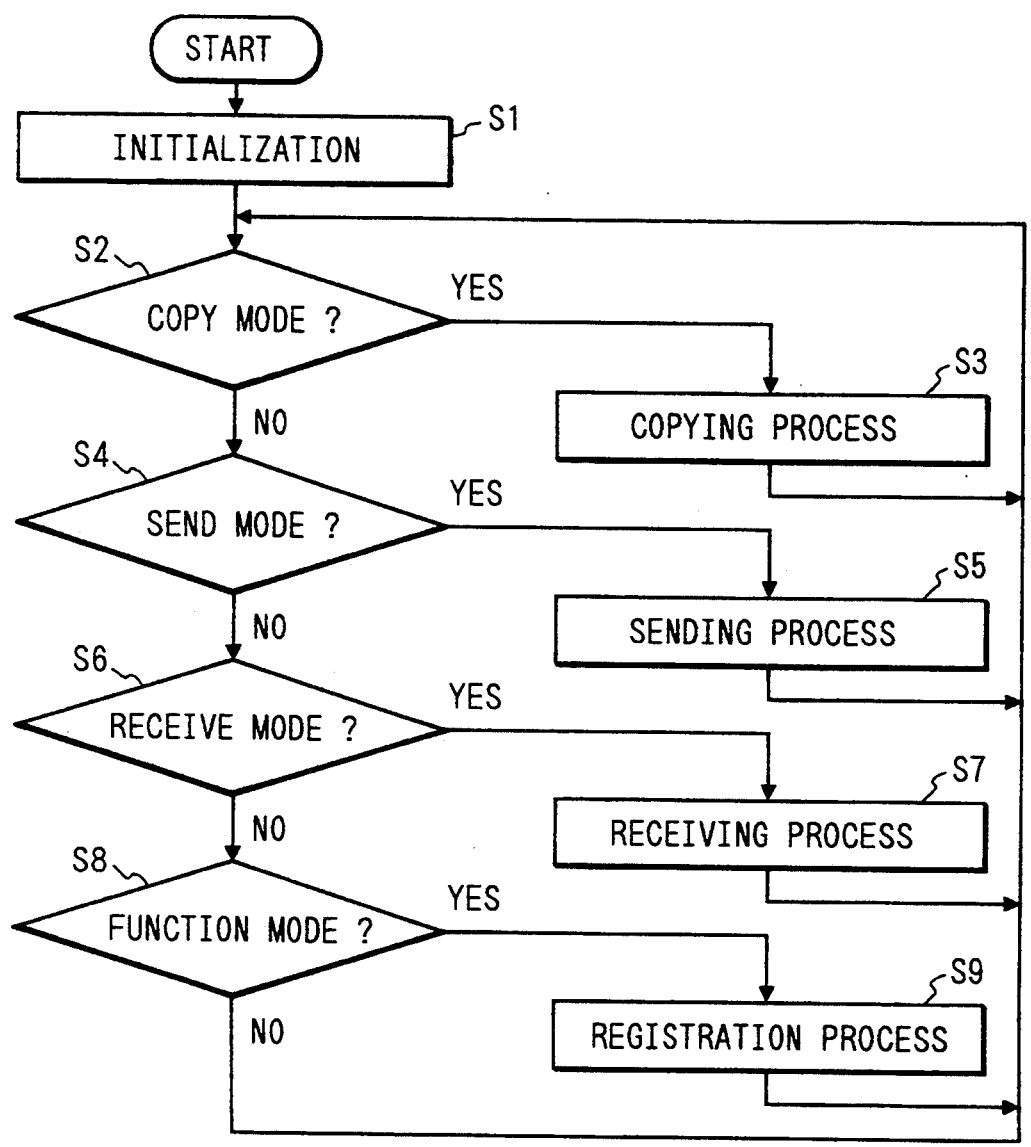
FIG. 5 shows a flow chart of an overall operation of the embodiment.

FIG. 5 shows a flow chart of the communication control protocol in the facsimile device of the present embodiment.

Figure 12:
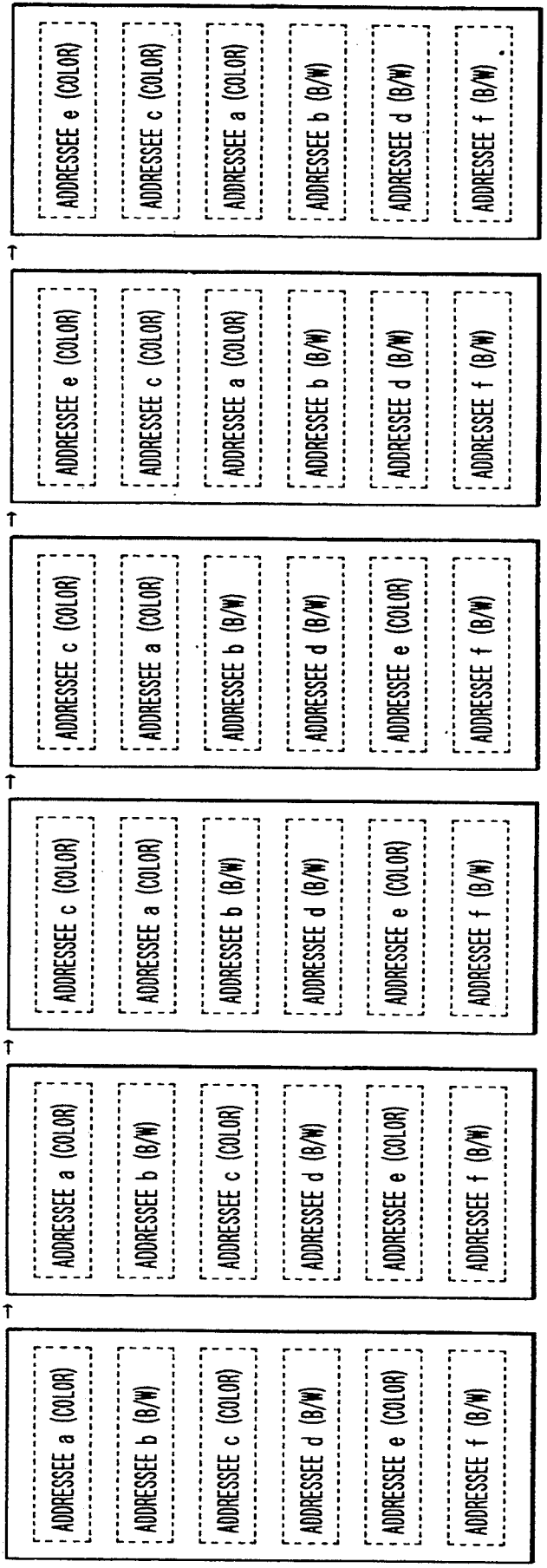
FIGS. 12A to 12F illustrate the rearrangement of addressees in the embodiment.

In FIG. 5, when the facsimile device is powered on, the CPU 2 initializes parameters in a step S1, and determines whether the reproduction, transmission, reception and function have been selected as the operation mode or not in steps S2, S4, S6 and S8, and the reproduction process, the transmission process, the reception process and the function process are executed in accordance with the decision (S3, S5, S7, and S9). For example, in the step S4, when the CPU 2 detects through the gate array 10 that a document sheet has been set in the apparatus and a one-touch key (not shown) of the key 29 has been depressed, the process proceeds to the transmission process of the step S5. When the multi-address transmission in which the dame image data is transmitted to a plurality of facsimile devices is to be conducted, the one-touch key of the key 29 is manipulated a plurality of times corresponding to a plurality of destinations and then a transmission start key is manipulated. When this manipulation is detected (step S4), the process proceeds to the step S5 to conduct the multi-address transmission. The number of times of manipulation of the one-touch key is set in an address counter as the number of multi-address transmission destinations. The input addresses are stored in an address table shown in FIG. 12 together with data indicating whether it is a color receiver or not.

Figure 6:
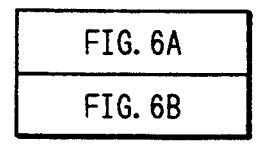
FIG. 6 is comprised of FIGS. 6A and 6B showing a flow chart of a transmission process of the embodiment.
Figure 6A:
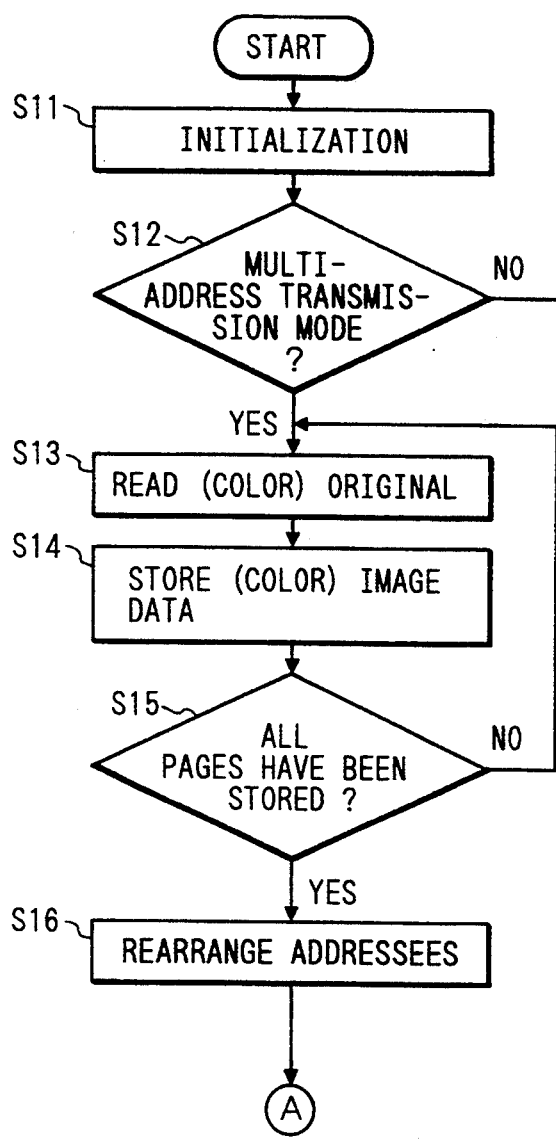
Figure 6B:
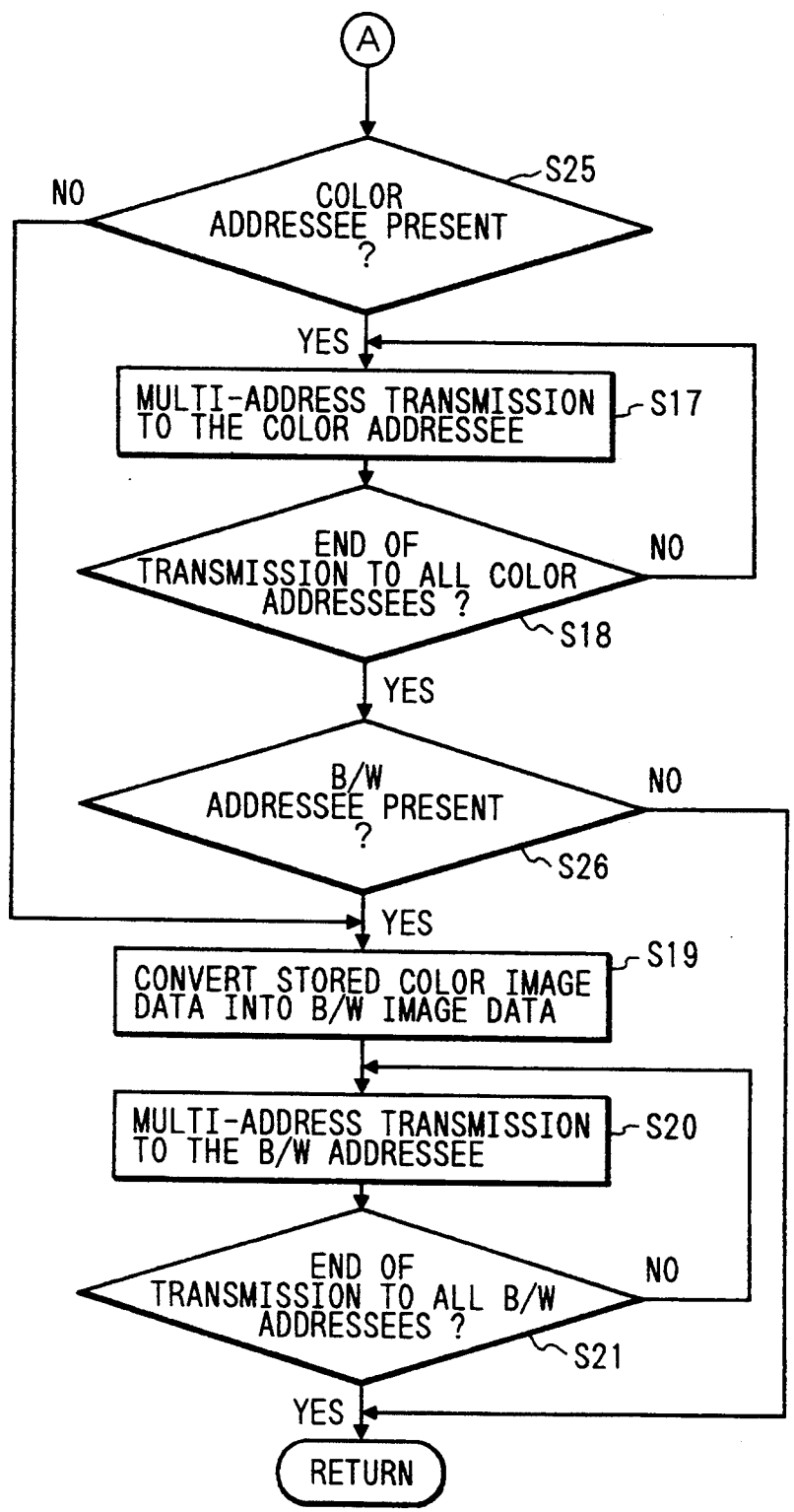

A detailed flow chart of the transmission process of the step S5 of FIG. 5 is shown in FIGS. 6A and 6B. In FIGS. 6A and 6B, parameters are initialized in a step S11, and whether it is the multi-address transmission or not is determined in a step S12. If it is a known one address transmission, the process branches to a step S22 to determine whether the destination station is a color receiver capable of receiving and reproducing a color image or not. If it is a color receiver, the hierarchy coded color image data stored in the image memory 6 is transmitted as it is in a step S24. On the other hand, if the destination is not a color receiver, the color image data stored in the image memory 6 is converted to monochromatic image data in a step S23 and the monochromatic data is transmitted in a step S24.

The data indicating whether the destination station is a color receiver or not is previously registered in the RAM in association with the one-touch key. The registration may be done by the key entry by an operator or by the entry of the decision for the NSF signal in the communication.

On the other hand, if it is determined in a step S12 that the one-touch key has been sequentially depressed, the decision to the multi-address transmission is YES and the process proceeds to a step S13. The loop of S13→S14→S15→S13 is executed by the number of document sheets set in the apparatus. Namely, all pages of the document sheets set in the apparatus are read and they are hierarchy coded for each color by the hierarchy coder/encoder 9 and the coded data is stored in the image memory 6. Then, the process proceeds to the steps S15 and S16 to rearrange the addresses. If a color receiver is included in the destinations of the multi-address transmission in the step S25, the color transmission process to the first addressee is conducted in a step S17, and the loop of S17·'S18·'S17 is executed by the number of addressees of the color transmission to transmit the color image to the destinations having the color receiving function designated as the multi-address transmission address. Then, if a monochromatic receiver is included in the multi-address transmission addressees in the step S26, the process proceeds to a step S19.

Figure 7:
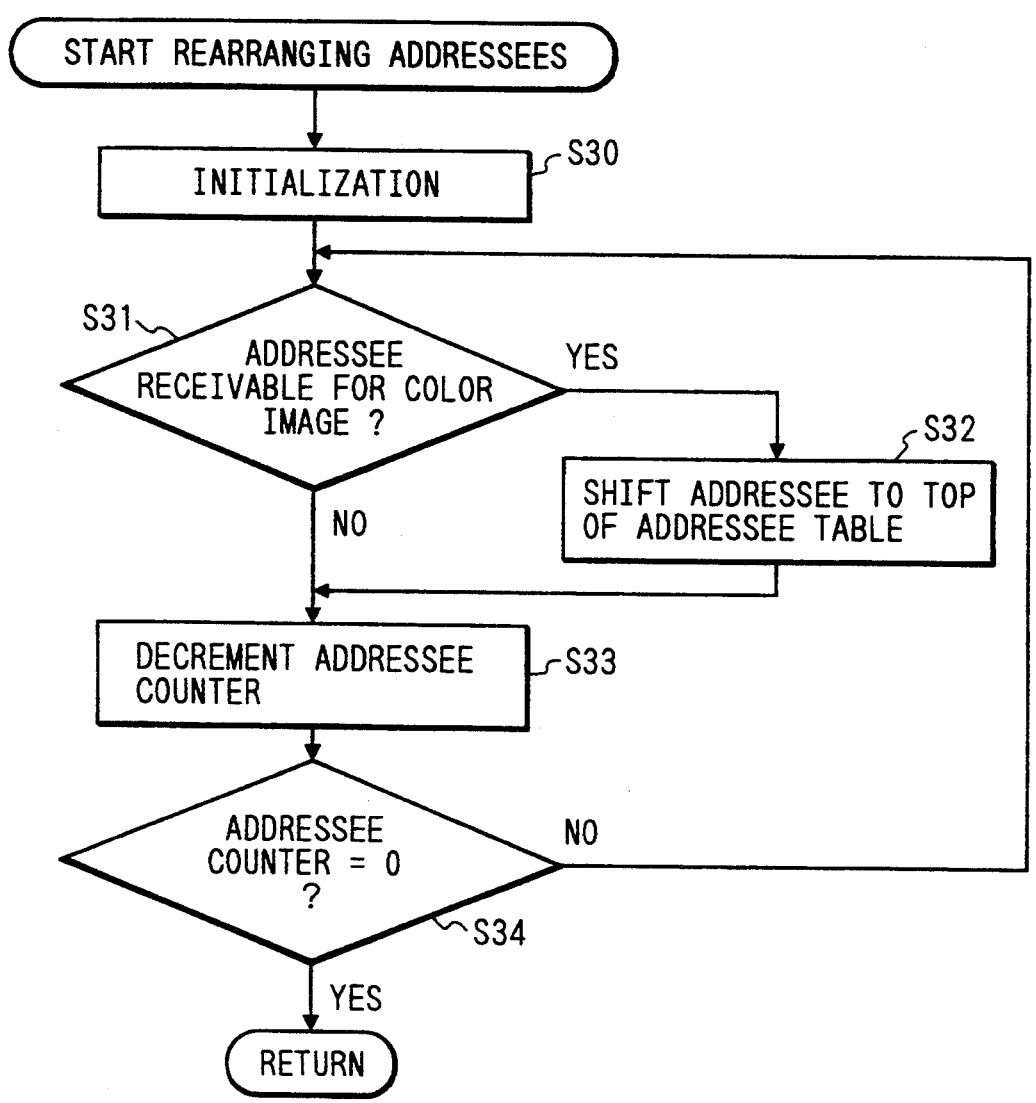
FIG. 7 shows a flow chart of an address rearranging process of the embodiment.

A detailed flow chart of the address rearrangement in the step S16 of FIG. 6A is shown in FIG. 7. In FIG. 7, parameters are initialized in a step S30. In a step S31, whether the addresses of the multi-address transmission can receive a color image or not is sequentially determined, and if the destination can receive the color image, the process proceeds to a step S32. In the step S32, the address is moved to the top of the address table shown in FIG. 13 (see FIGS. 12C and 12E). Then, the process proceeds to a step S33. If the decision that the destination can receive the color image has not been made, namely, if it is decided that the destination cannot receive the color image or if it is not yet decided whether the destination cannot receive the color image or can receive the color image, the process proceeds to the step S33 without changing the address table (see FIGS. 12B, 12D and 12F). In the step S33, the address counter which contains the rearrangement control parameter is decremented by one, in a step S34, whether the address counter is zero or not is determined, and in a step S34, the process returns to the step S31 if the address counter is not zero. In the step S34, the process returns if the address counter is zero.

Through the above rearrangement process, the data array (FIG. 12A) of the multi-address transmission destinations set in the address memory during the multiple manipulation of the one-touch key is separated into the color receiver and the color receiver (FIG. 12F) and the address memory is rearranged.

The image information stored in color in the image memory 6 in the steps S13 and S14 of FIG. 6A is converted to a monochromatic image by the CPU 2 in a step S19. A detailed flow chart of the step S19 and the step S23 is shown in FIG. 8. In FIG. 8, parameters are initialized in a step S40. In a step S41, one page of color image data hierarchy coded for each color and stored in the image memory is decoded up to the resolution of the original image (400 dpi) by the hierarchy coder/decoder 9 and the decoded R data, G data and B data are re-stored in the image memory 6.

In a step S42, the one page of RGB data stored in the image memory 6 is color/monochrome converted, and in a step S43, the monochromatic image data generated by the color/monochrome conversion is coded by the hierarchy coder/decoder 9 and it is stored in the image memory 6.

In a step S44, a page counter indicating the number of document sheets to be transmitted is decremented by one.

In a step S45, a page pointed indicating the next image data is incremented by one in preparation for the steps S41 and S42.

In a step S46, whether the page counter is zero or not is checked, and the process returns to the step S41 until it reaches zero to repeat the loop S41→S42→S43→S44→S45→S46→S41. When the color/monochrome conversion of all pages is completed, the decision in the step S46 is YES and the process returns.

Figure 9:
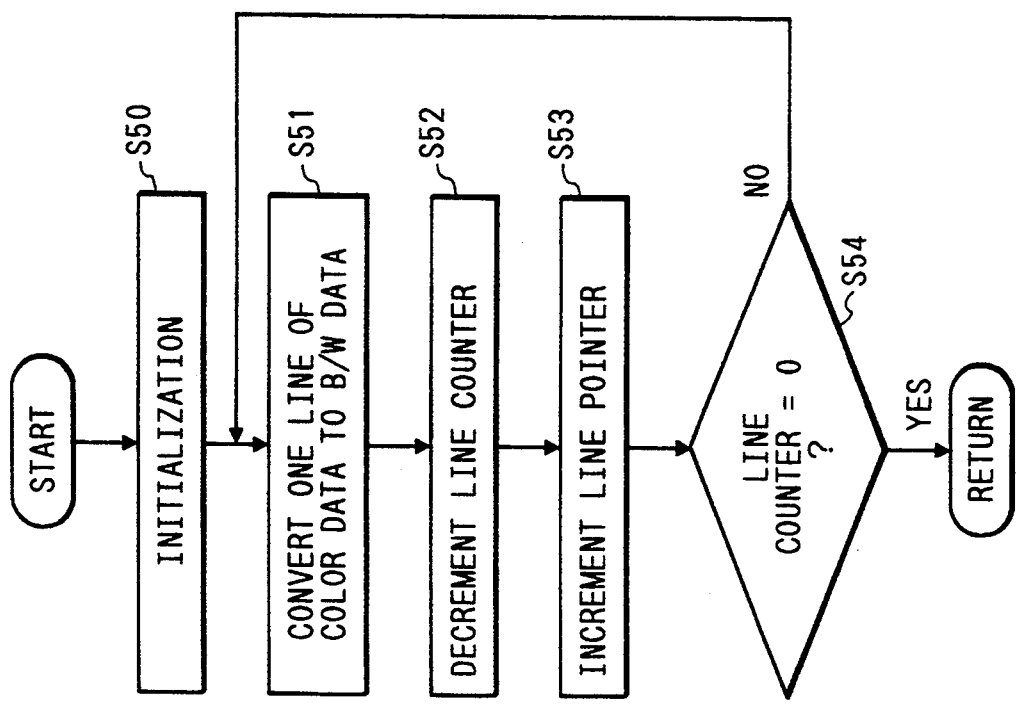
FIG. 9 shows a detailed flow chart of FIG. 8 of the embodiment.

A detailed flow chart of the step S41 of FIG. 8 is shown in FIG. 9. In a step S50, parameters are initialized. In a step S51, one line of image data is color/monochrome converted. In a step S52, a line counter indicating the number of lines in one page is decremented by one and a line pointer indicating the next image line is incremented by one in a step S53 in preparation for the next step S51. In a step S54, whether the line counter is zero or not is checked and the process returns to the step S51 until it reaches zero to repeat the loop S51→S52→S53→S54→S51. When all lines (one page) of color/monochrome conversion is completed, the decision in the step S54 is YES and the process returns.

Figure 10:
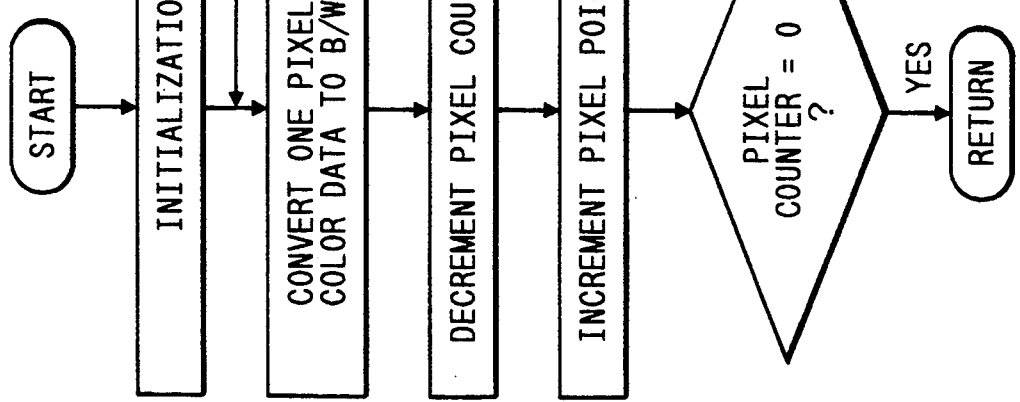
FIG. 10 shows a detailed flow chart of FIG. 9 of the embodiment.

A detailed flow chart of the step S51 of FIG. 9 is shown in FIG. 10. In a step S60, parameters are initialized. In a step S61, one pixel of image data is color/monochrome converted. In a step S62, a pixel counter indicating the number of pixels in one line is decremented by one and a pixel pointer indicating the next pixel is incremented by one in a step S63 in preparation for the next step S63. In a step S64, whether the pixel counter is zero or not is checked and the process returns to the step S61 until it reaches zero to repeat the loop S61→S62→S63→S64→S61. When the color/monochrome conversion of one pixel of image data is completed, the decision in the step S64 is YES and the process returns.

Figure 11:
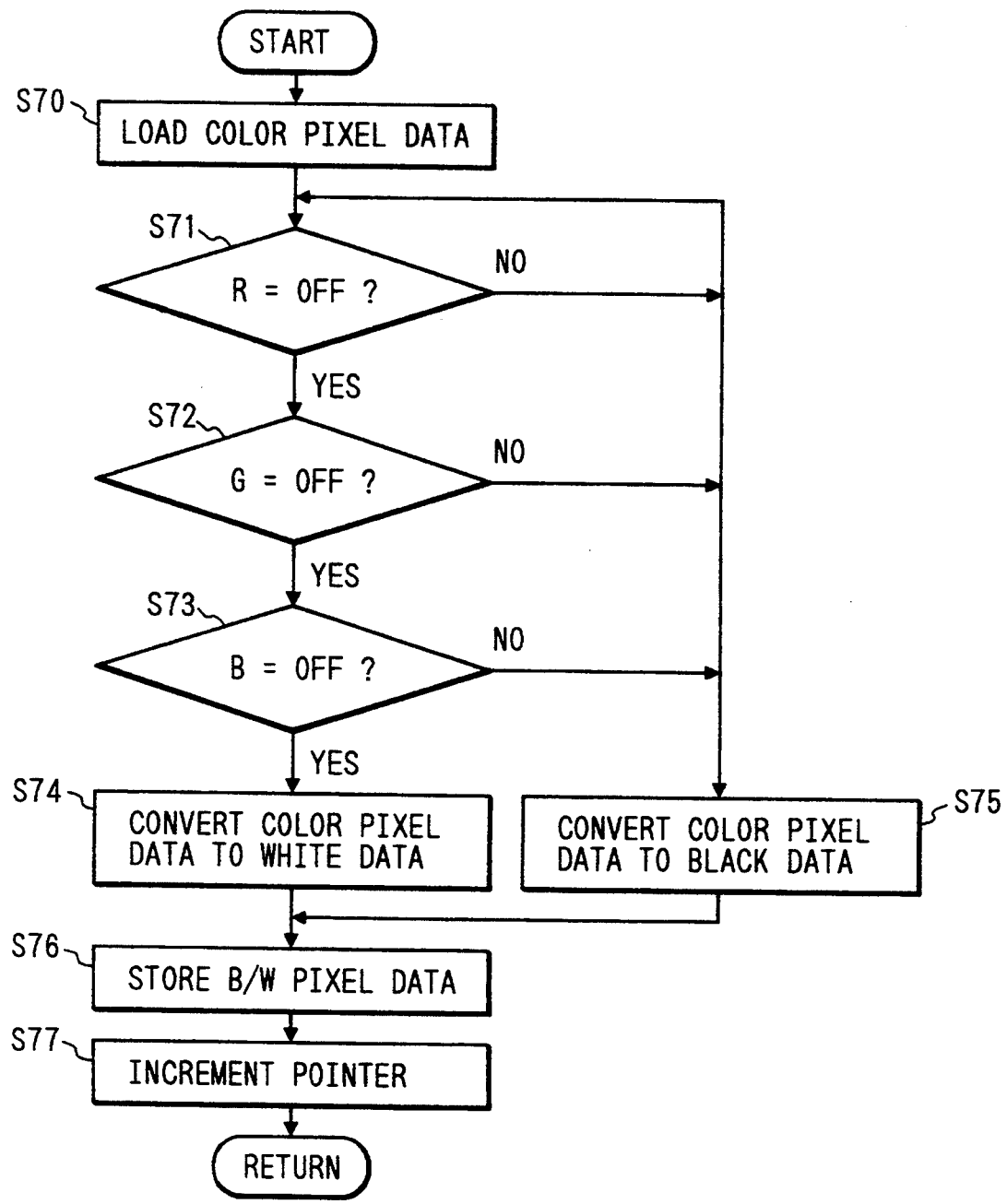
FIG. 11 shows a detailed flow chart of FIG. 10 of the embodiment.

FIG. 11 shows a detailed flow chart of the step S61 of FIG. 10. In a step S70, one pixel of the color pixel data designated by the pixel point is loaded.

In steps S71, S72 and S73, whether the components of the pixel data are zero level, that is, white or not is determined, and all of the color data (R data, G data and B data) are zero level, the process proceeds a path S71→S72→S73→S74 and in the step S74, it is determined that the color/monochrome converted image data is white, and the process proceeds to a step S76. It at least one of the R data, G data and B data is not zero, that is, not white, the process proceeds from a step S71 or S72 or S73 to the step S75. In the step S75, it is determined that the color/monochrome converted image data is black and the process proceeds to a step S76. In the step S76, the color/monochrome converted image data is stored at the memory address (image memory 6) pointed by a store pointer.

The process then proceeds from a step S76 to a step S77 to increment the store pointer by one in preparation for the next step S76.

Figure 13:
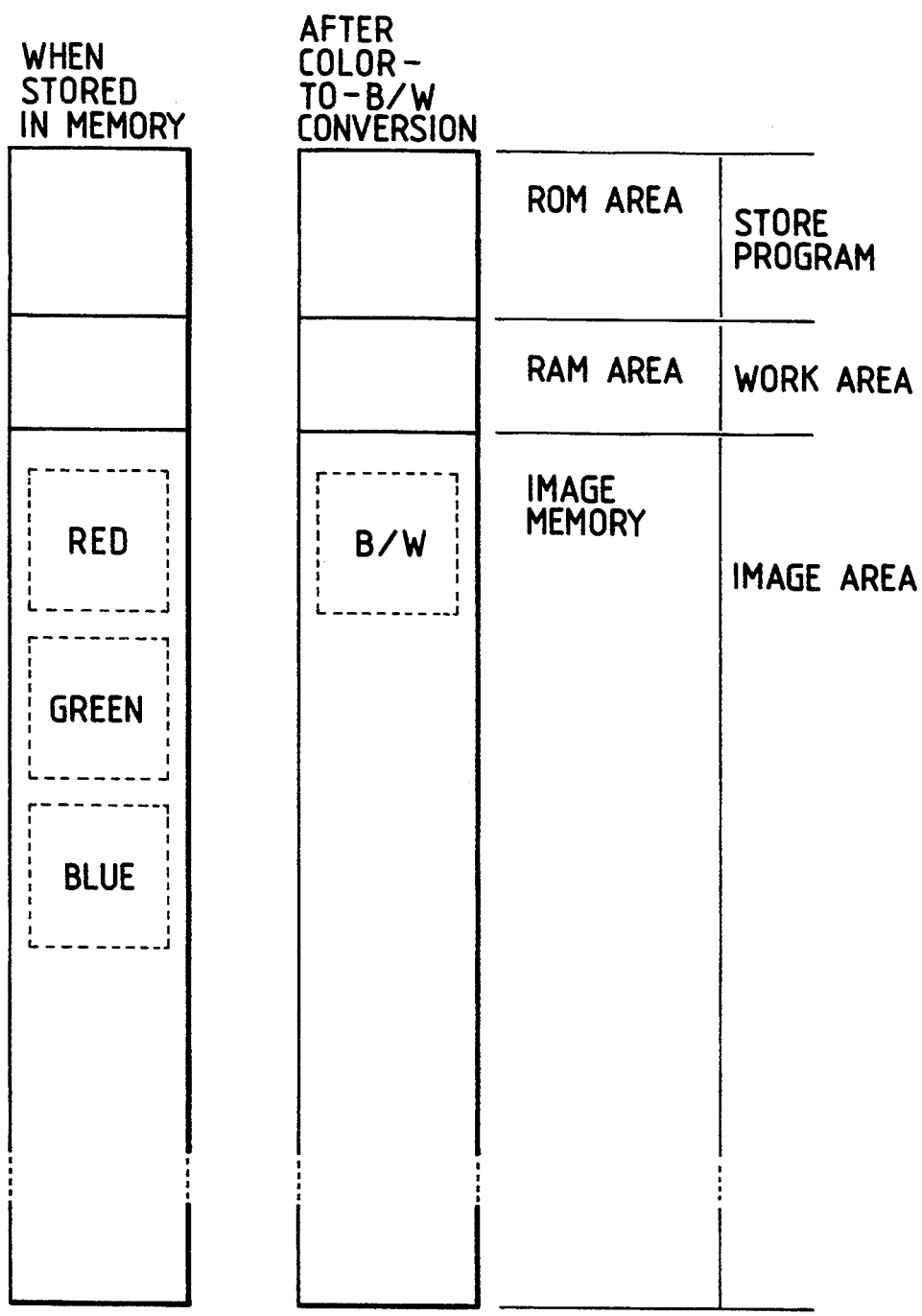
FIG. 13 shows a color/monochrome conversion memory map in the embodiment.

Memory maps on the ROM 3, RAM 4 and the image memory 6 before and after the execution of the step S19 of FIG. 6B is shown in FIG. 13. As seen from FIG. 13, the monochromatic data is stored in approximately one third of the area used for the R, G and B data stored in the memory. Accordingly, this vacant area can be used for other processing.

When the color/monochrome conversion of the step S19 of FIG. 6B is completed, the process proceeds to a step S20. The process repeats the loop S20→S21→S20 to color/monochrome convert the image data for a FAX which can receive only the monochromatic image data and transmit the hierarchy decoded monochromatic data stored in the image memory 6 to the destination designated for the multi-address transmission.

Accordingly, when the step S20 of FIG. 6B is executed, the vacant area in the image memory 6 increases as shown in the memory map of FIG. 3, and the vacant area is efficiently used for known dual access, timer transmission reservation or acting (or substitutional) reception. If the vacant area is small, the image memory could not be efficiently used for the dual access.

In the above embodiment, the destinations of the multi-address transmission capable of color image reception and not capable of color image reception area mixedly included. In the hierarchy coded multi-address transmission, even if all of the destinations designated by the multi-address transmission are capable of receiving the color image or not capable of receiving the color image, similar control to that described above may be done when the receiving stations include apparatus capable of receiving high resolution (400 dpi) data and apparatus not capable of receiving high resolution (400 dpi) data but capable of receiving only low resolution (200 dpi for example) data.

Figure 14:
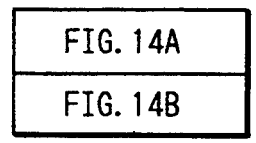
FIG. 14 is comprised of FIGS. 14A and 14B showing a flow chart of another transmission process in the embodiment.
Figure 14A:
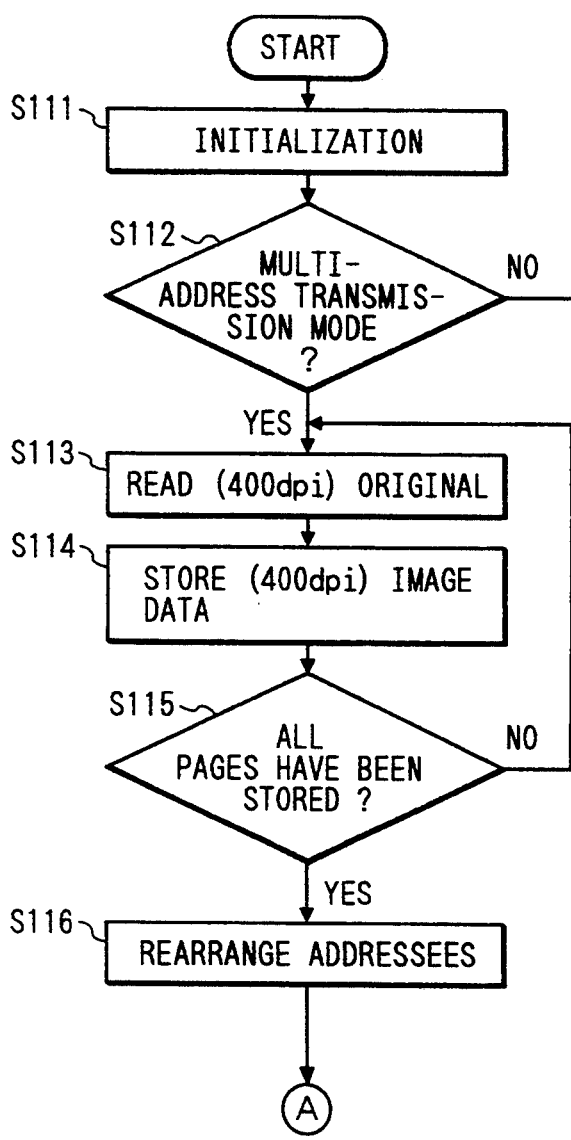
Figure 14B:
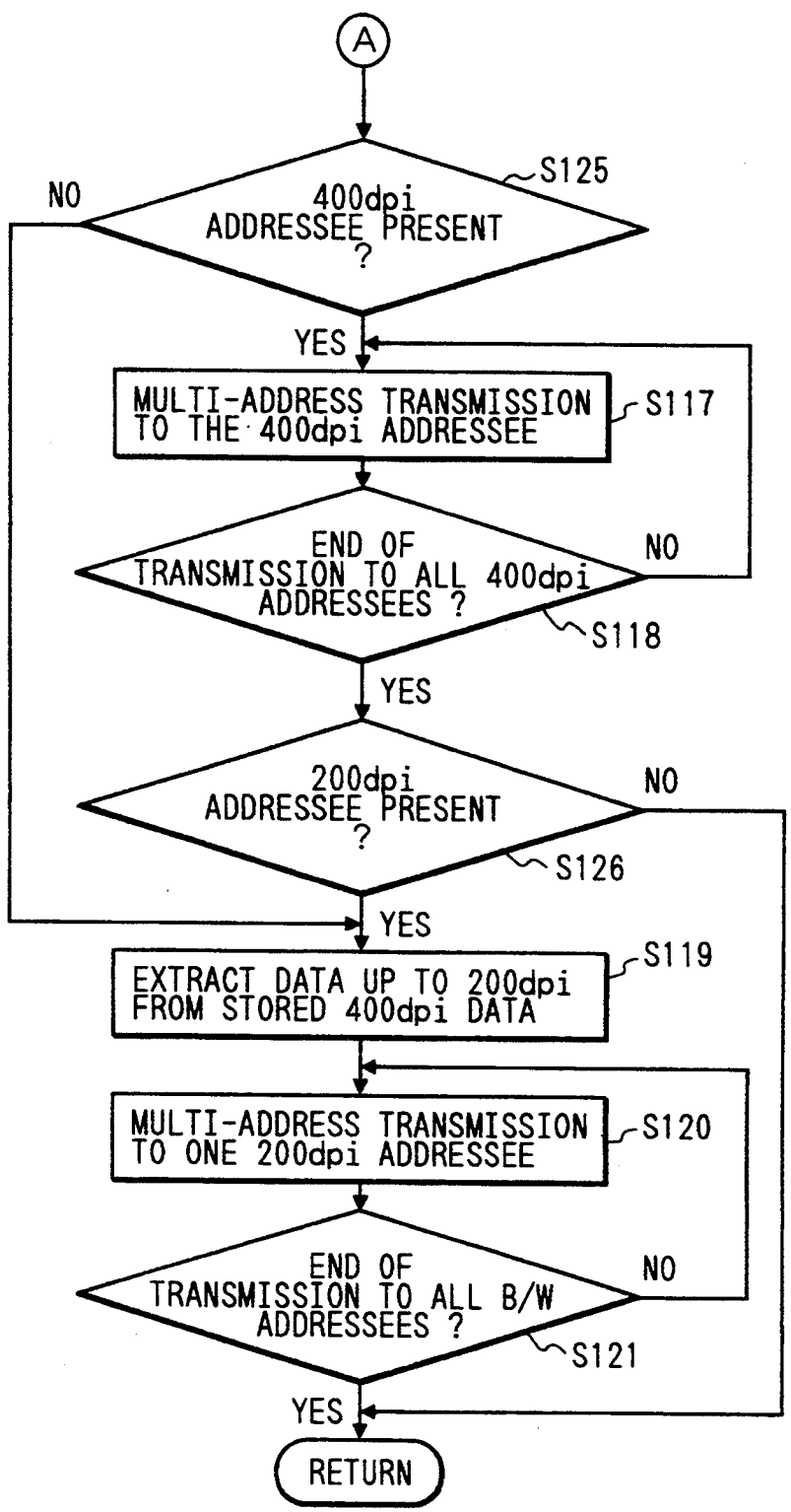

A flow chart therefor is shown in FIGS. 14A and 14B.

In FIGS. 14A and 14B, parameters are initialized in a step S111. In a step S112, whether it is multi-address transmission or not is determined. If it is a known one address transmission, the process branches to a step S122 to determine if the destination is capable of receiving 400 dpi image data or not. If it is capable of receiving 400 dpi, the color image data (400 dpi) stored in the image memory 6 is transmitted as it is in a step S124. On the other hand, if it is not capable of receiving 400 dpi, the coded data up to 200 dpi is extracted from the 400 dpi coded data stored in the image memory 6 in a step S123, and the 200 dpi color image data is transmitted in a step S124.

Whether the destination is capable of receiving the 400 dpi image data or not is previously registered in the RAM in association with the one-touch key. The registration may be made by the manipulation of the key by the operator or the entry of the decision of the DIS signal described above.

On the other hand, if it has been determined in the step S112 that the one-touch key has been sequentially depressed, the decision for the multi-address transmission is YES and the process proceeds to a step S113. The loop S113→S114→S115→S113 is executed by the number of times equal to the number of document sheets set in the apparatus. Namely, all pages of the document sheets set in the apparatus are read and stored in the image memory 6. Then, the process proceeds from a step S115 to a step S116 to rearrange the addresses. If the multi-address transmission destinations include the apparatus capable of receiving 400 dpi in the step S125, the one address 400 dpi image transmission is conducted in a step S117 and the loop S117→S118→S117 is repeated by the number of addressees of the color communication to transmit the 400 dpi image to the destination is capable of receiving the 400 dpi image designated as the destinations of the multi-address transmission. Then, the process proceeds to a step S126

In a step S126, if the apparatus not capable of receiving the 400 dpi image is designated as the destination of the multi-transmission destination, the process proceeds to a step S119. In the step S119, the hierarchy coded data up to 200 dpi is extracted from the 400 dpi hierarchy coded data stored in the image memory 6.

Memory maps on the ROM 3 and the RAM 4 before and after the execution of the step S119 of FIG. 14B is shown in FIG. 15.

When the step S119 of FIG. 14B is completed, the process proceeds to a step S120. The loop S120→S121→S120 is repeated to send the 400/200 dpi converted image data to a FAX device in the receiving station which cannot receive the 400 dpi image.

Accordingly, when the step S120 of FIG. 14B is executed, the vacant area in the image data of the RAM increases as shown in the memory map of FIG. 15 and the vacant area may be used for known dual access, timer transmission reservation or acting (or substitutional) reception. If the vacant area is small, the dual access could not be executed.

The various processes of FIGS. 14A and 14B such as the rearrangement of the addresses are similar to those of FIGS. 6A and 6B and the detail thereof is omitted.

In accordance with the present embodiment, in the facsimile device capable of conducting the hierarchy coding and the multi-address transmission, the transmission is terminated when the transmission is completed to the resolution hierarchy designated by the destination so that the efficiency of the multi-address transmission is improved.

In the color transmission, the color data is transmitted if the destination are capable of receiving the color image, and if they are not capable of receiving the color data, the color data is converted to the monochromatic data for transmission, and the color transmission and the monochrome transmission are conducted in block. Accordingly, the efficiency of the multi-address transmission can be improved.

The operations shown in FIGS. 6A and 6B and FIGS. 14A and 14B may be combined so that the multi-address transmission destinations are classified into four groups depending on a combination of whether the multi-address transmission destinations are capable of receiving the color image or not and whether they are capable of receiving the high resolution image or not, and the order of transmission may be rearranged in accordance therewith to execute the multi-address transmission.

While the present invention has been described in connection with the preferred embodiments, the present invention is not limited to those embodiments and various modifications may be made without departing from the scope of the claims.

What is claimed is:

1. An image communication apparatus comprising:
    memory means for storing image data to be transmitted to multiple addresses in accordance with respective functions of the addresses;
    rearranging means for rearranging the multiple addresses in accordance with functions thereof in such a way that addresses to which image data is to be transmitted in accordance with a same function are ordered successively; and
    transmission means for sequentially transmitting the image data stored in said memory means to the multiple addresses rearranged by said rearranging means.

2. An image communication apparatus according to claim 1, further comprising storage means for storing the multiple addresses.

3. An image communication apparatus according to claim 1, further comprising conversion means for converting the image data stored in said memory means in accordance with the functions the addresses.

4. An image communication apparatus according to claim 3, wherein said conversion means converts a resolution of the image data.

5. An image communication apparatus according to claim 3, wherein said conversion means converts color image data to monochromatic image data.

6. An image communication apparatus according to claim 3, wherein said memory means stores the converted image data.

7. An image communication apparatus comprising:
    memory means for storing image data to be transmitted to multiple addresses;
    classification means for classifying the multiple addresses in accordance with receiving resolutions thereof;
    conversion means for converting a resolution of the image data stored in said memory means in accordance with the receiving resolutions of the multiple addresses classified by said classification means; and
    transmission means for sequentially transmitting, to the multiple addresses classified by said classification means, the image data having the receiving resolutions of the classified multiple addresses.

8. An image communication apparatus according to claim 7, wherein said classification means rearranges an order of transmission of the image data to the multiple addresses.

9. An image communication apparatus according to claim 8, wherein said classification means rearranges the order of transmission of the image data so that the addresses with a same receiving resolution are ordered successively.

10. An image communication apparatus according to claim 7, wherein said memory means stores hierarchically coded image data.

11. An image communication apparatus according to claim 7, wherein said memory means stores image data converted by said conversion means.

12. An image communication apparatus according to claim 7, further comprising storage means for storing the multiple addresses.

13. An image communication apparatus comprising:
    memory means for storing color image data to be transmitted to multiple addresses;
    classification means for classifying the multiple addresses depending upon whether or not they are capable of receiving color image data;
    conversion means for converting the color image data stored in said memory means to monochromatic image data in accordance with the multiple addresses classified by said classification means; and
    transmission means for sequentially transmitting, to the multiple addresses classified by said classification means, the color image data or the monochromatic image data, depending upon whether or not the classified multiple addresses are capable of receiving the color image data.

14. An image communication apparatus according to claim 13, wherein said classification means rearranges an order of transmission of the color image data to the multiple addresses.

15. An image communication apparatus according to claim 14, wherein said classification means rearranges the order of transmission of the color image data so that addresses which are capable of receiving the color image data are ordered successively.

16. An image communication apparatus according to claim 13, wherein said memory means stores hierarchically coded color image data.

17. An image communication apparatus according to claim 13, wherein said memory means stores the monochromatic image data.

18. An image communication apparatus according to claim 13, further comprising storage means for storing the multiple addresses.

19. A method for communicating an image comprising the steps of:
    storing image data to be transmitted to multiple addresses in accordance with respective functions of the addresses;
    rearranging the multiple addresses in accordance with functions thereof so that the addresses to which image data is to be transmitted in accordance with a same function are ordered successively; and
    sequentially transmitting the stored image data to the multiple rearranged addresses.

20. A method for communicating an image according to claim 19, wherein the image data to be transmitted is converted in accordance with the functions of the addresses.

21. A method for communicating an image according to claim 20, wherein a resolution of the image data is converted.

22. A method for communicating an image according to claim 20, wherein color image data is converted to monochromatic image data.

23. An image communication apparatus comprising:
    generating means for generating image data to be transmitted to multiple addresses in accordance with respective functions of the addresses;
    rearranging means for rearranging the multiple addresses in accordance with functions thereof so that addresses to which image data is to be transmitted in accordance with a same function are ordered successively;

conversion means for converting the image data from said generating means to image data associated with the functions of the multiple addresses; and transmission means for sequentially transmitting, to the multiple addresses rearranged by said rearranging means, the image data associated with the functions of the multiple addresses.

24. An image communication apparatus according to claim 23, further comprising memory means for storing the image data generated by said generating means and the image data converted by said conversion means.

25. An image communication apparatus according to claim 23, wherein said conversion means converts a resolution of the image data from said generating means.

26. An image communication apparatus according to claim 23, wherein said conversion means converts color image data to monochromatic image data.

27. An image communication apparatus according to claim 23, further comprising storage means for storing the multiple addresses.

* * * * *

UNITED STATES PATENT AND TRADEMARK OFFICE
CERTIFICATE OF CORRECTION

PATENT NO. : 5,392,133
DATED : February 21, 1995
INVENTOR(S) : TOSHIFUMI NAKAJIMA It is certified that error appears in the above-identified patent and that said Letters Patent is hereby corrected as shown below:

ON TITLE PAGE

Under Primary Examiner: "Roger" should read --Rogers--.

COLUMN 3

Line 29, "form" should read --from--.

COLUMN 4

Line 7, ".number" should read --number--.
Line 55, "dame" should read --same--.

COLUMN 5

Line 36, "S17→S18→S17" should read --S17→S18→S17--.

COLUMN 6

Line 24, "pointed" should read --pointer--.

COLUMN 7

Line 3, "It" should read --If--.
Line 17, "is" should read --are--.
Line 39, "area" should read --are--.

COLUMN 8

Line 19, "is" should be deleted.
Line 22, "step S126" should read --step S126.--.
Line 30, "is" should read --are--.
Line 55, "destination" should read --destinations--.

UNITED STATES PATENT AND TRADEMARK OFFICE
CERTIFICATE OF CORRECTION

PATENT NO. : 5,392,133
DATED : February 21, 1995
INVENTOR(S) : TOSHIFUMI NAKAJIMA It is certified that error appears in the above-identified patent and that said Letters Patent is hereby corrected as shown below:

COLUMN 9

Line 29, "functions" should read --functions of--.

Signed and Sealed this

Thirteenth Day of June, 1995

BRUCE LEHMAN

*Attest:*

*Attesting Officer*     *Commissioner of Patents and Trademarks*